(12) United States Patent
Oh et al.

(10) Patent No.: US 7,035,043 B2
(45) Date of Patent: Apr. 25, 2006

(54) MOVING DECK PLATE FOR CAMCORDER

(75) Inventors: Jeong-hyeob Oh, Anyang (KR); Bong-joo Kim, Suwon (KR); Do-young Choi, Suwon (KR); Seung-woo Lee, Suwon (KR); Jun-young Kim, Suwon (KR); Hyeong-seok Choi, Suwon (KR); Young-ho Cho, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 38 days.

(21) Appl. No.: 10/305,130

(22) Filed: Nov. 27, 2002

(65) Prior Publication Data
US 2003/0137637 A1    Jul. 24, 2003

(30) Foreign Application Priority Data
Jan. 18, 2002    (KR)    ................... 2002-3125

(51) Int. Cl.
*G11B 5/27*    (2006.01)
(52) U.S. Cl. .................................... 360/85
(58) Field of Classification Search ............. 360/85, 360/130.22, 130.23, 130.24
See application file for complete search history.

(56) References Cited

U.S. PATENT DOCUMENTS 4,520,411 A * 5/1985 Ohshima .................. 360/85
5,077,624 A * 12/1991 Nakanishi ................. 360/85
5,330,123 A * 7/1994 Baek et al. ............... 242/346.1
5,793,562 A * 8/1998 Kang et al. ................. 360/85
5,801,989 A * 9/1998 Lee et al. ................. 365/185.22
5,982,590 A * 11/1999 Kinjo et al. ............. 360/291.5

FOREIGN PATENT DOCUMENTS

| CN | 1169006 |   | 12/1997 |
| JP | 1-133251 | * | 5/1989 |
| JP | 5-189843 |   | 7/1993 |
| JP | 8-55318 | * | 2/1996 |

OTHER PUBLICATIONS

Chinese Office Action issued on May 13, 2005.

* cited by examiner

*Primary Examiner*—Angel Castro
(74) *Attorney, Agent, or Firm*—Staas & Halsey LLP

(57) ABSTRACT

A moving deck plate for a camcorder has a sub-chassis slidably moving with respect to a main chassis. A drum base is integrally formed with the main chassis. A pair of stationary guide rails are integrally protruded from both sides of the drum base. A pair of movable guide rails provided at the sub-chassis are docked to the pair of stationary guide rails to form a moving path, along which a pair of pole bases move to draw a magnetic tape from the tape cassette. One of the stationary guide rails is coupled to the drum base by a first bridge-type reinforcing rib.

19 Claims, 5 Drawing Sheets

MOVING DECK PLATE FOR CAMCORDER

CROSS-REFERENCE TO RELATED APPLICATIONS

This application claims the benefit of Korean Application No. 2002-3125, filed Jan. 18, 2002, in the Korean Industrial Property Office, the disclosure of which is incorporated herein by reference.

BACKGROUND OF THE INVENTION

1. Field of the Invention

The present invention relates to a construction of a deck plate with a head drum of a tape recorder being mounted thereon, and more particularly, to a construction of a moving deck plate for a camcorder having a sub-chassis slidably moving with respect to a main chassis.

2. Description of the Related Art

Figure 1:
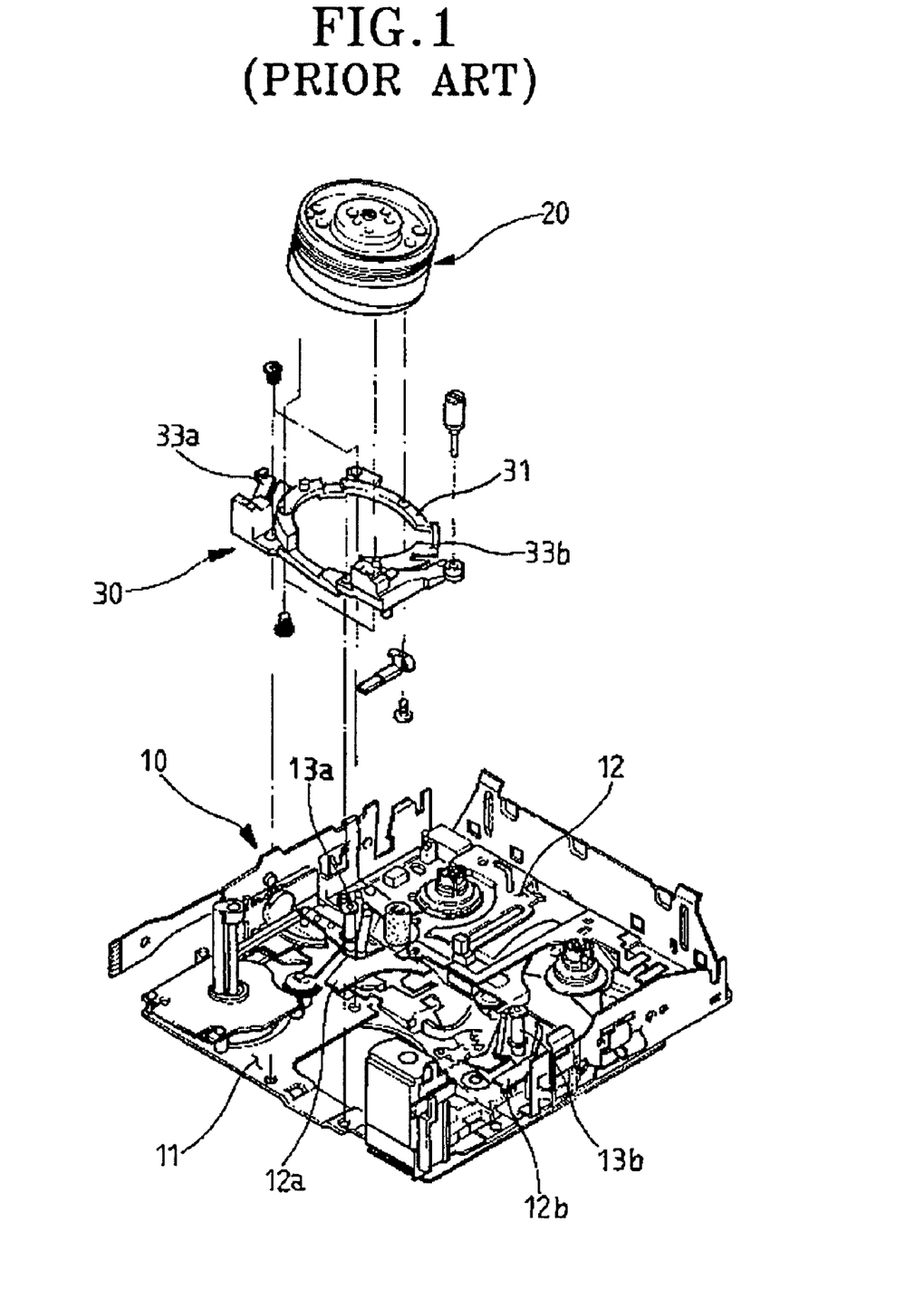
FIG. 1 is an exploded view schematically illustrating a moving deck plate for a conventional camcorder.
Figure 2:
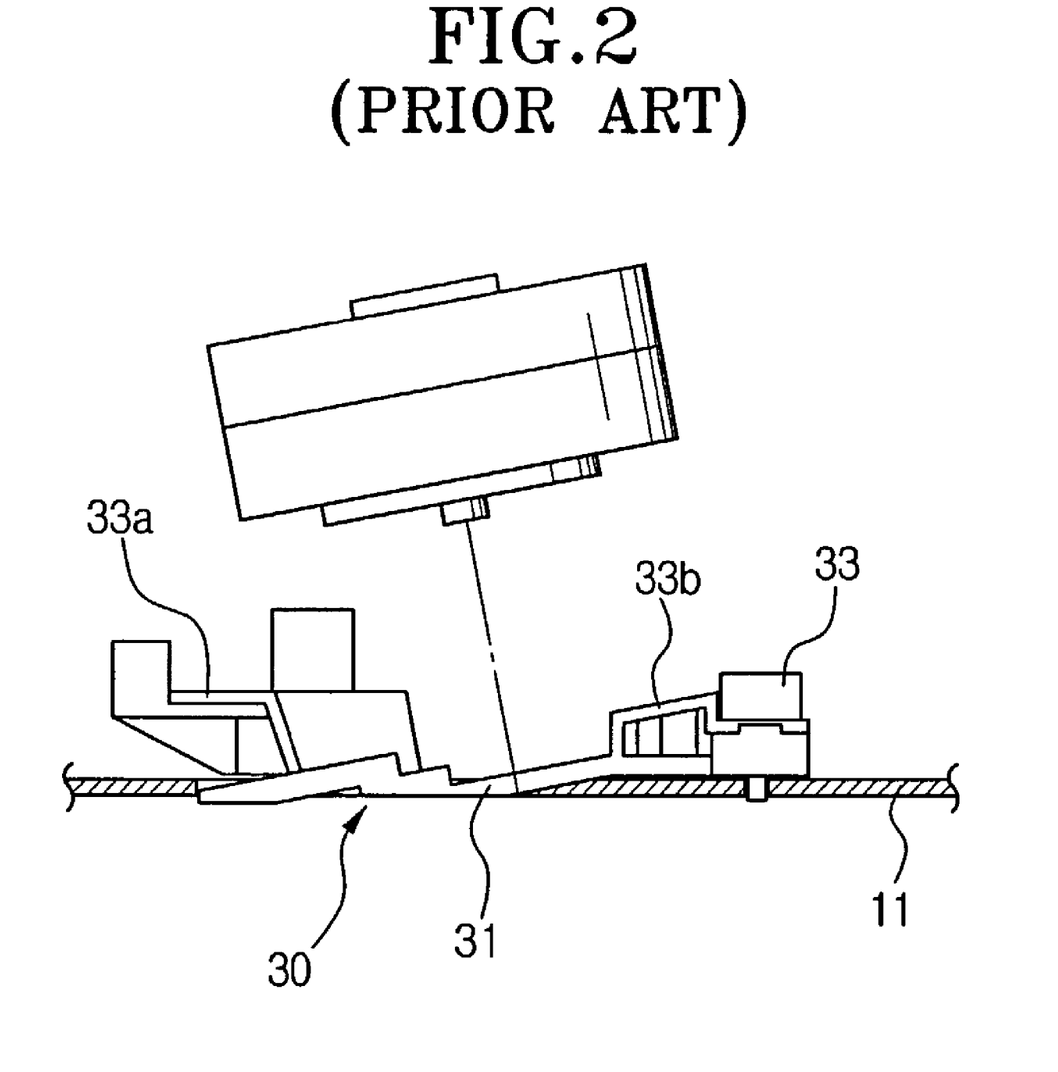
FIG. 2 is a cross sectional view illustrating a major part of FIG. 1.

Generally, a video tape recorder integrated with a camera is called a camcorder or a video tape recorder such as a VCR. Such a video tape recorder integrated with a camera includes a head drum assembly 20 rotating around a main chassis 11 of a deck 10 at high speed, as shown in FIG. 1, to record/reproduce information on/from a traveling magnetic tape by scanning a magnetic head. FIG. 1 shows a major part of a running deck of a typical camcorder, in which the head drum assembly 20 is slantingly positioned on the main chassis 11, with the head drum assembly 20 being seated on a drum base 30.

The above construction causes stable running of the magnetic tape by use of the head drum assembly 20 of a helical-scan type. The drum base 30 includes a ring-shaped base member 31, and a pair of stationary guide rails 33a and 33b each being integrally located on both sides of the ring-shaped base member 31. The drum base 30 is manufactured by a separate process (like, for example, a die casting), separately from the main chassis 11 and the head drum assembly 20.

The stationary guide rails 33a and 33b form a moving path, along which a pair of pole bases 13a and 13b move in cooperation with a pair of movable guide rails 12a and 12b. The movable guide rails 12a and 12b are provided at a front end of a sub-chassis 12. When the sub-chassis 12 is slidably moved toward the head drum assembly 20 during a loading of a tape cassette (not shown), the movable guide rails 12a and 12b are docked to the stationary guide rails 33a and 33b, respectively. Here, the pair of pole bases 13a and 13b draw the magnetic tape (not shown) from the tape cassette, and then move along the movable guide rails 12a and 12b and the stationary guide rails 33a and 33b. Thus, the magnetic tape is closely contacted to the head drum assembly 20 with the magnetic tape being wound on an outer circumference of the head drum assembly 20 by a half turn.

Manufacturers of the above video tape recorder (camcorder) are mainly interested in a reduction of its number of parts and a manufacturing cost, an increase in productivity of its automation and assemblability, and improvement of its performance. In light of this trend, the construction of the head drum mounted deck plate for the conventional camcorder described above has the following drawbacks in manufacturing.

First, since the drum base 30 is manufactured as a separate component through a precision process, and since fasteners such as a screw or supporting piece are required for the connection of the components, the number of components and processes increases, thereby increasing product price.

Secondly, since the head drum 20 is assembled to the drum base 30 to mount on the main chassis 11 as a sub-assembly state, processes of supplying and handling components are increased, thereby increasing manufacturing lead time and decreasing productivity. Finally, since the main chassis 11, head drum 20 and drum base 30 are manufactured and assembled as a separate component, quality control and automation becomes complex, thereby obstructing the improvement of performance and precision.

SUMMARY OF THE INVENTION

Accordingly, it is an object of the present invention to provide a moving deck plate for a camcorder capable of improving its assemblability, by omitting a number of components, reducing a manufacturing cost through automation, and improving productivity and driving precision.

Additional objects and advantages of the invention will be set forth in part in the description which follows and, in part, will be obvious from the description, or may be learned by practice of the invention.

The foregoing and other objects of the present invention are achieved by providing a moving deck plate for a camcorder. The moving deck plate includes a main chassis with a head drum assembly mounted thereon, and a sub-chassis slidably moving toward the head drum assembly on the main chassis. Upon loading of a tape cassette, a drum base, on which the head drum assembly is mounted, is integrally formed with the main chassis with the drum base slantingly protruding toward one side. A pair of stationary guide rails are integrally protruding from both sides of the drum base. A pair of movable guide rails provided at the sub-chassis are docked to the pair of stationary guide rails to form a moving path along which a pair of pole bases move to draw a magnetic tape from the tape cassette. One of the stationary guide rails is coupled to the drum base by a first bridge-type reinforcing rib.

According to an aspect of the invention, the other of the stationary guide rails is coupled to the main chassis by a second bridge-type reinforcing rib, and at least two or more of the first and second reinforcing ribs are provided.

According to another aspect of the invention, the drum base includes a complementary positioning and engaging device, which has at least one positioning hole and a plurality of first engaging holes formed on a lower portion of the head drum. Also, a positioning pin is provided at the drum base to be inserted into the positioning hole, and a plurality of second engaging holes are formed on the drum base to allow a fastening member to pass through in correspondence with the first engaging holes.

According to an aspect of the invention, the positioning pin is integrally shaped with the drum base with the positioning pin being perpendicular relative to a surface of the drum base.

According to yet another aspect of the invention, the drum base and the pair of stationary guide rails are shaped from a portion of the main chassis by pressing.

BRIEF DESCRIPTION OF THE DRAWINGS

The above and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 3:
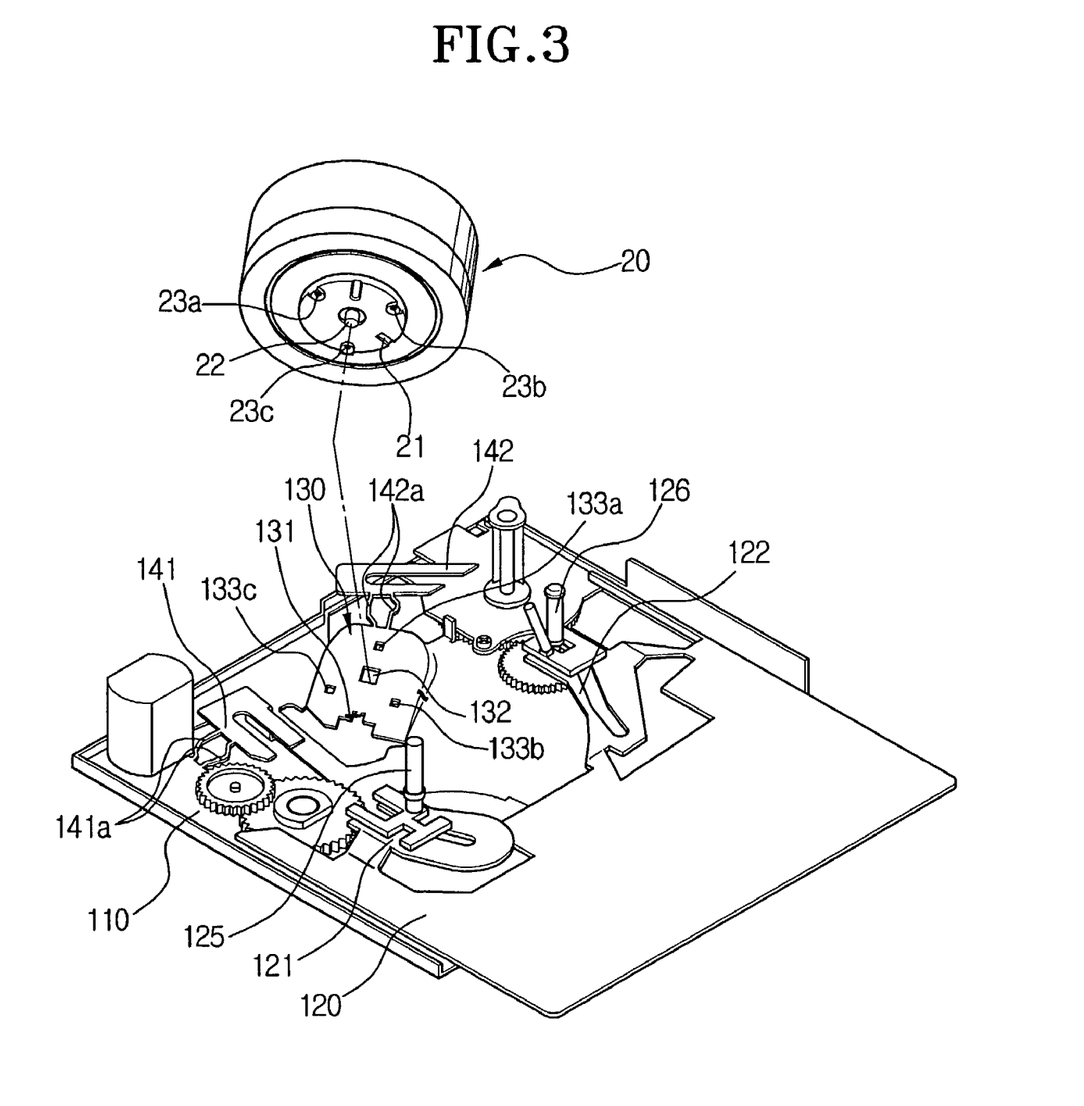
FIG. 3 is a perspective view illustrating a moving deck plate for a camcorder, according to an embodiment of the present invention.
Figure 4:
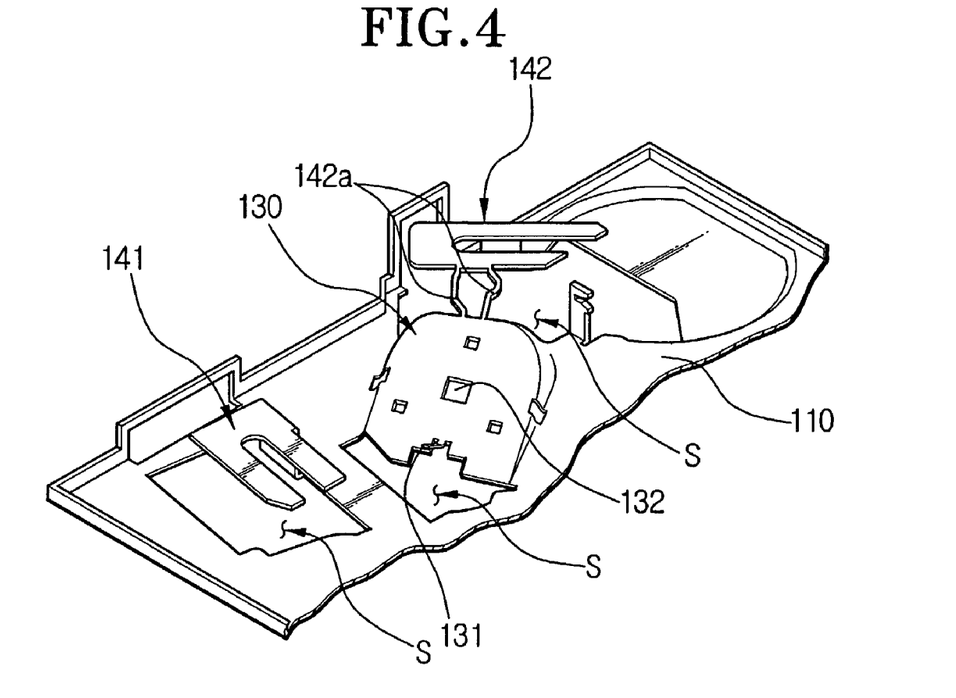
FIGS. 4 and 5 are perspective views illustrating a moving deck plate for a camcorder, according to an embodiment of the present invention.
Figure 5:
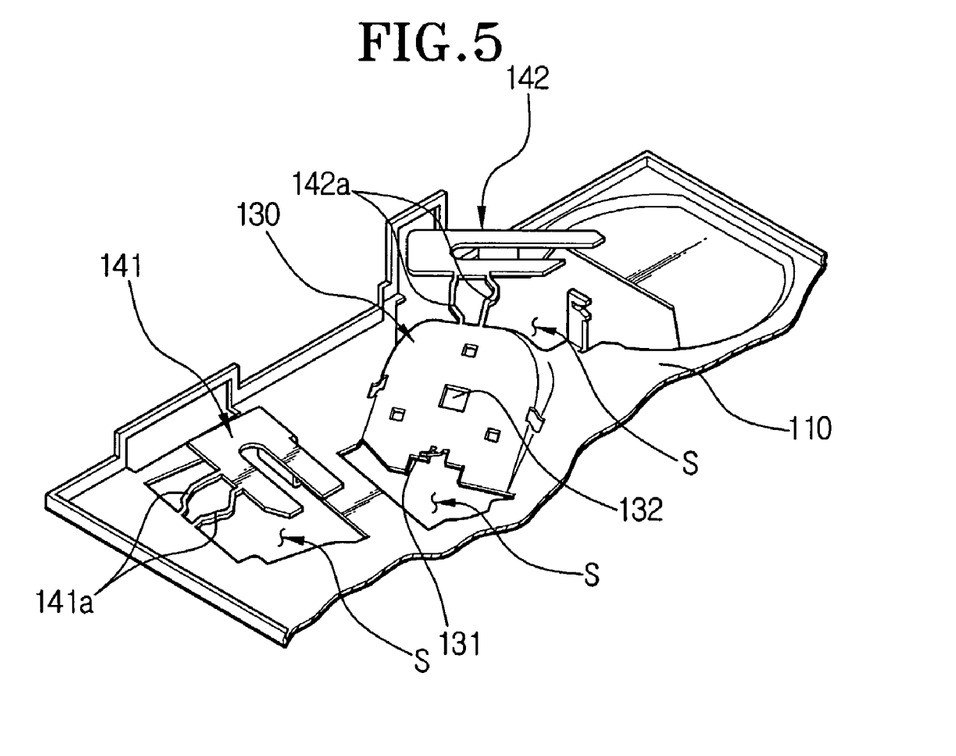
Figure 6:
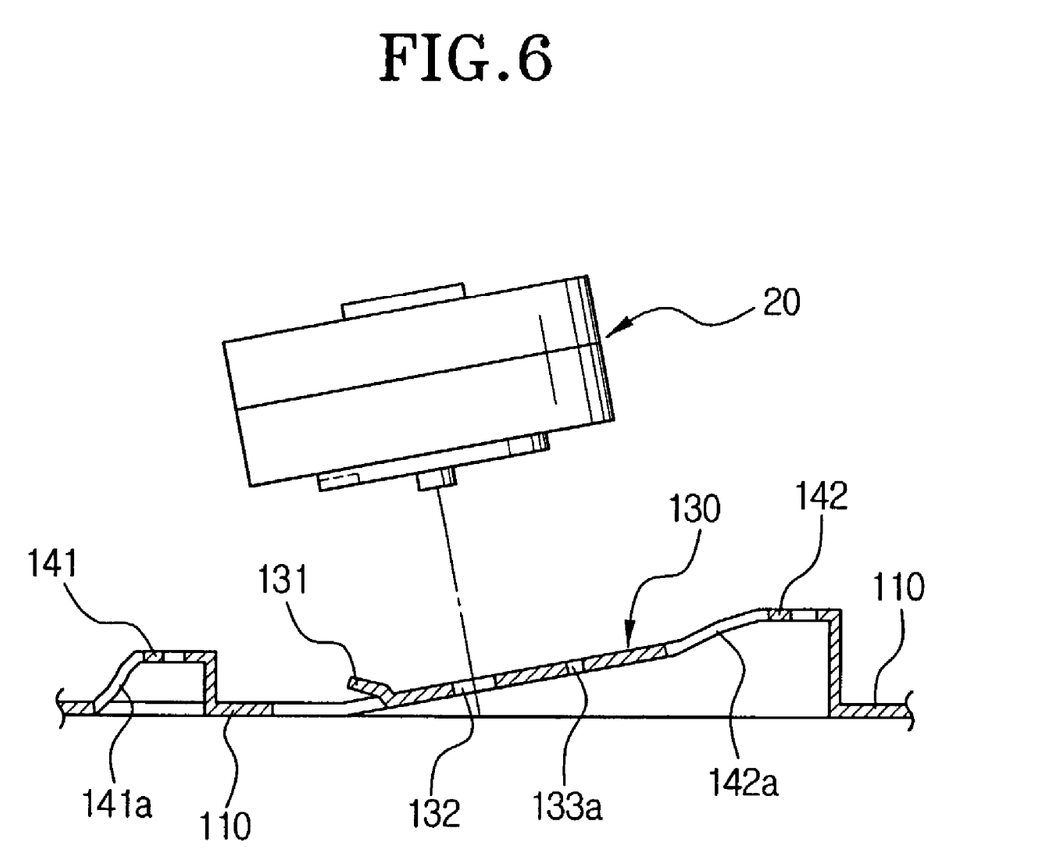
FIG. 6 is a cross sectional view illustrating a major part of FIG. 3.

Referring to FIGS. 3 through 6, a moving deck plate of the present invention includes a slanted drum base 130 integrally formed on a main chassis 110, on which a head drum assembly 20 is mounted. The drum base 130 is integrally formed with the main chassis 110 so that a pair of stationary guide rails 141 and 142 are protruding from both sides of the drum base. One of the stationary guide rails 141 and 142, e.g., the stationary guide rail 142, is coupled to the drum base 130 by a first bridge-type reinforcing rib 142a. According to another aspect of the present invention, the other of the stationary guide rails 141 and 142, the stationary guide rail 141, is coupled to the main chassis 110 by a second bridge-type reinforcing rib 141a, as shown in FIG. 5.

The drum base 130 and the pair of stationary guide rails 141 and 142 are integrally shaped on the main chassis 110 by, for example, pressing. Specifically, the stationary guide rails 141 and 142 are formed by a portion of the main chassis 110 which is cut and bent. Referring to FIGS. 4 and 5, a plurality of through-holes S are formed adjacent to the drum base 130 and the pair of stationary guide rails 141 and 142 by punching.

Referring to FIG. 3, the pair of stationary guide rails 141 and 142 form a moving path along which a pair of pole bases 125 and 126 move in cooperation with a pair of movable guide rails 121 and 122. Specifically, upon loading of a tape cassette (not shown), a sub-chassis 120 is slidably moved toward the head drum assembly 20 on the main chassis 110. Accordingly, the pair of movable guide rails 121 and 122 provided at a front end of the sub-chassis 120 are docked to the pair of stationary guide rails 141 and 142, respectively. At this time, the pair of pole bases 125 and 126 draw magnetic tape (not shown) from the tape cassette, so that the magnetic tape is closely contacted to the head drum assembly 20 while being wound on an outer circumference of the head drum assembly 20 by a half turn.

The drum base 130 includes a positioning pin 131 to determine an engaged position of the head drum assembly 20. The positioning pin 131 is complementary to a positioning hole 21 formed on a lower portion of the head drum assembly 20, to determine a position at which the head drum assembly 20 is seated on the drum base 130.

According to the present invention, a shaft receiving groove 132 formed on a center portion of the drum base 30 is also provided to determine the engaged position of the head drum assembly 20. A rotating shaft 22 protruded from the lower portion of the head drum assembly 20 is inserted into the shaft receiving groove 132.

The drum base 130 is provided with a plurality of engaging holes 133a, 133b and 133c so that screws are fastened to a plurality of fastening holes 23a, 23b and 23c formed on the lower portion of the head drum assembly 20. The fastening holes 23a, 23b and 23c and the engaging holes 133a, 133b and 133c may be formed during a pressing process of forming the drum base 130 and the pair of stationary guide rails 141 and 142.

According to the moving deck plate as described above, since the drum base 130 is integrally formed with the main chassis 110 through a pressing process of the main chassis 110 and the drum base 130, a process of separately assembling the drum base 130 and the head drum assembly 20 may be omitted, which is contrary to the conventional moving deck plate.

In addition, the stationary guide rails 141 and 142 are integrally shaped with the main chassis 110 through the process of pressing the main chassis 110,. Free ends of the stationary guide rails 141 and 142 are engaged to the drum base 130 and the main chassis 110 by the first and second bridge-type reinforcing ribs 142a and 141a, respectively. When the sub-chassis 120 is moved, the movable guide rails 121 and 122 are docked to the stationary guide rails 141 and 142. Accordingly, it is possible to prevent the movable guide rails 121 and 122 from being shifted, and precise docking is achieved. Therefore, mechanical driving precision is improved to guide a sliding movement of the pole bases 125 and 126.

In the construction that the drum base 130 and the stationary guide rails 141 and 142 are integrally formed with the main chassis 110, and that the stationary guide rails 141 and 142 are engaged to the main chassis 110 and the drum base 130 through the bridge-type reinforcing ribs 142a and 141a, respectively, the process of assembling the head drum assembly 20 will be described below.

The rotating shaft 22 protruding from the lower portion of the head drum is inserted into the shaft receiving groove 132 of the drum base 130 while being simultaneously rotated, so that the positioning pin 131 is inserted into the positioning hole 21 to determine the engaged position. Here, the fastening holes 23a, 23b and 23c and the engaging holes 133a, 133b and 133c are arranged to be opposed to each other, and then screws are fastened into the holes, thereby completing a mounting process of the head drum assembly 20. By predetermining relative positions of the fastening holes 23a, 23b and 23c and the engaging holes 133a, 133b and 133c with respect to each other when mechanically producing the holes, the holes may be arranged to be opposed to each other by the positioning of the positioning pin 131 and the positioning hole 21.

According to the moving deck plate of the present invention, the head drum assembly 20 may be directly mounted onto the drum base 130, which is integrally formed with the main chassis 110.

Effects of the mounting construction of the moving deck plate and the head drum of the present invention will be described below.

First, the drum base 130 is not manufactured as a separate component, but is integrally shaped with the main chassis 110, thereby eliminating a separate manufacturing process such as die casting. In addition, since fastening components such as screw may be removed, it is possible to reduce a manufacturing cost by reducing the manufacturing process and manufacturing components therefor. Secondly, since the process of assembling the drum base 130 and the head drum assembly 20 in a sub-assembly state may be omitted, the process of supplying and handling components may be reduced, thereby reducing the manufacturing lead time and obtaining easy quality control. Thirdly, the head drum assembly 20 is directly mounted onto the drum base 130, thereby facilitating the assembling process and achieving simple automation.

Finally, the stationary guide rails 141 and 142 forming the moving path of the pole bases 125 and 126 are integrally formed with the main chassis 110 in the pressing process. Thus, simultaneously, each free end of the stationary guide rails 141 and 142 is engaged to the drum base 130 and the main chassis 110 by the bridge-type reinforcing ribs 141*a* and 142*a*, and the sub-chassis 120 is prevented from moving, thereby providing precise docking to the movable guide rails 121 and 122. Accordingly, the pole bases 125 and 126 are stably slidably moved, thereby improving a mechanical driving precision and obtaining improved performance of the moving deck plate.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A moving deck plate for a tape recorder, comprising:
   a main chassis with a head drum assembly mounted thereon;
   a sub-chassis slidably moving toward the head drum assembly on the main chassis upon loading of a tape cassette;
   a drum base on which the head drum assembly is mounted, integrally formed with the main chassis and slantingly protruding toward one side thereof;
   a pair of stationary guide rails integrally protruding from both sides of the drum base;
   a pair of movable guide rails provided at the sub-chassis and docked to the pair of stationary guide rails to form a moving path along which a pair of pole bases move to draw a magnetic tape from the tape cassette; and
   a first bridge-type reinforcing rib to couple a respective one of the stationary guide rails to the drum base, the respective one of the stationary guide rails having a substantially planar shape, and the first bridge-type reinforcing rib being relatively thin in a direction perpendicular to the plane of the respective stationary guide rail.

2. The moving deck plate as claimed in claim 1, wherein the drum base further comprises:
   a complementary positioning and engaging device, the complementary positioning and engaging device having at least one positioning hole and a plurality of first engaging holes formed on a lower portion of the head drum assembly, wherein a positioning pin is provided at the drum base to be inserted into the positioning hole, and a plurality of second engaging holes are formed on the drum base to allow a fastening member to pass through in correspondence with the first engaging holes.

3. The moving deck plate as claimed in claim 2, wherein the complementary positioning and engaging device further comprises:
   a rotating shaft protruding downward from the head drum assembly; and
   a shaft receiving groove formed on the drum base to receive the rotating shaft.

4. The moving deck plate as claimed in claim 3, wherein the shaft receiving groove is formed on a center portion of the drum base to determine an engaged position of the head drum assembly.

5. The moving deck plate as claimed in claim 4, wherein the rotating shaft is inserted into the shaft receiving groove.

6. The moving deck plate as claimed in claim 2, wherein the positioning pin is integrally shaped with the drum base with the positioning pin being perpendicular relative to a surface of the drum base.

7. The moving deck plate as claimed in claim 2, wherein the positioning pin is complementary to the positioning hole formed on the lower portion of the head drum assembly to determine a position at which the head drum assembly is seated on the drum base.

8. The moving deck plate as claimed in claim 1, wherein the drum base is integrally formed with the main chassis, thereby eliminating a separate assembly of the drum base and the main chassis.

9. The moving deck plate as claimed in claim 1, wherein the sub-chassis moves to dock the movable guide rails to the stationary guide rails, thereby preventing the movable guide rails from being shifted, and allowing precise docking to the movable guide rails.

10. The moving deck plate as claimed in claim 1, further comprising:
    a plurality of through-holes formed adjacent to the drum base and the pair of stationary guide rails by punching.

11. A moving deck plate for a tape recorder, comprising:
    a main chassis with a head drum assembly mounted thereon;
    a sub-chassis slidably moving toward the head drum assembly on the main chassis upon loading of a tape cassette;
    a drum base on which the head drum assembly is mounted, integrally formed with the main chassis and slantingly protruding toward one side thereof;
    a pair of stationary guide rails integrally protruding from both sides of the drum base;
    a pair of movable guide rails provided at the sub-chassis and docked to the pair of stationary guide rails to form a moving path along which a pair of cole bases move to draw a magnetic tape from the tape cassette;
    a first bridge-type reinforcing rib to couple one of the stationary guide rails to the drum base; and
    a second bridge-type reinforcing rib to couple the other of the stationary guide rails to the main chassis.

12. The moving deck plate as claimed in claim 11, wherein two or more first and second reinforcing ribs are provided on the moving deck plate.

13. A moving deck plate for a tape recorder, comprising:
    a main chassis with a head drum assembly mounted thereon;
    a sub-chassis slidably moving toward the head drum assembly on the main chassis upon loading of a tape cassette;
    a drum base on which the head drum assembly is mounted, integrally formed with the main chassis and slantingly protruding toward one side thereof;
    a pair of stationary guide rails integrally protruding from both sides of the drum base;
    a pair of movable guide rails provided at the sub-chassis and docked to the pair of stationary guide rails to form a moving path along which a pair of pole bases move to draw a magnetic tape from the tape cassette; and
    a first bridge-type reinforcing rib to couple one of the stationary guide rails to the drum base, wherein the drum base and the pair of stationary guide rails are shaped from a portion of the main chassis by pressing.

14. A moving deck plate for a tape recorder, comprising:
a main chassis with a head drum assembly mounted thereon;
a sub-chassis slidably moving toward the head drum assembly on the main chassis upon loading of a tape cassette;
a drum base on which the head drum assembly is mounted, integrally formed with the main chassis and slantingly protruding toward one side thereof;
a guide rail having a substantially planar shape protruding from the drum base; and
a bridge-type reinforcing rib to couple the guide rail to the drum base, and the bridge-type reinforcing rib being relatively thin in a direction perpendicular to the plane of the guide rail.

15. A method of manufacturing a moving deck plate for a tape recorder, comprising:
mounting a head drum assembly on a drum base on a main chassis;
sliding a sub-chassis toward the head drum assembly mounted on the main chassis; integrally forming a drum base with the main chassis at a slantingly protruding position toward one side thereof;
protruding a guide rail having a substantially planar shape from the drum base; and
coupling the guide rail to the drum base with a reinforcing rib, the reinforcing rib being relatively thin in a direction perpendicular to the plane of the guide rail.

16. The method of claim 15, further comprising:
forming a plurality of fastening holes on a lower portion of the head drum assembly; and
forming a plurality of engaging holes on the drum base to position the head drum assembly on the drum base.

17. The method of claim 16, further comprising:
forming a positioning hole on the lower portion of the head drum assembly; and
forming a positioning pin on the drum base to determine an engaged position at which the head drum assembly is seated on the drum base.

18. The method of claim 17, wherein the positioning pin is integrally shaped with the drum base, with the positioning pin being perpendicular relative to a surface of the drum base.

19. The method of claim of claim 18, wherein the drum base is integrally formed with the main chassis, thereby eliminating a separate assembly of the drum base and the main chassis.

* * * * *

UNITED STATES PATENT AND TRADEMARK OFFICE
CERTIFICATE OF CORRECTION

| | |
|---|---|
| PATENT NO. | : 7,035,043 B2 |
| APPLICATION NO. | : 10/305130 |
| DATED | : April 25, 2006 |
| INVENTOR(S) | : Jeong-hyeob Oh et al. |

It is certified that error appears in the above-identified patent and that said Letters Patent is hereby corrected as shown below:

Column 6, Line 42, change "cole" to --pole--.

Column 8, Line 21, after "method" delete "of claim".

Signed and Sealed this

Twenty-eighth Day of November, 2006

JON W. DUDAS
*Director of the United States Patent and Trademark Office*